UNITED STATES PATENT OFFICE.

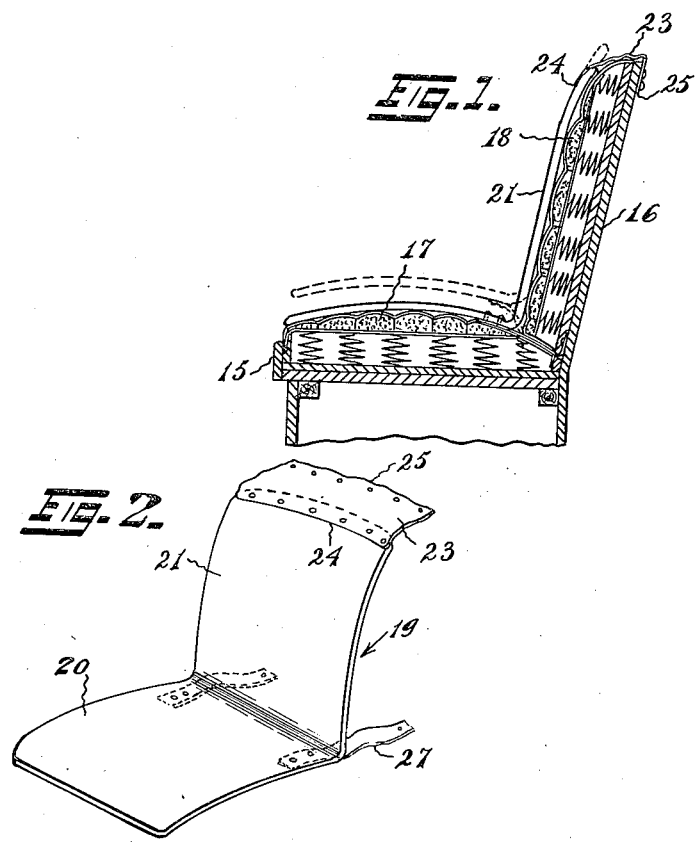

OLAF K. PACHT, OF NEW YORK, N. Y.

SEAT.

1,373,200. Specification of Letters Patent. Patented Mar. 29, 1921.

Application filed September 4, 1919. Serial No. 321,510.

*To all whom it may concern:*

Be it known that I, OLAF K. PACHT, a subject of the King of Denmark, residing in New York city, in the county of New York and State of New York, have invented certain new and useful Improvements in Seats, of which the following is a specification.

This invention relates to seats for automobiles, other vehicles and the like, and has for its object to provide a supplementary seat for obviating the rubbing of the rider's back against the back of the seat and to provide an individual shock absorber for vehicle seats for the personal comfort of the rider in the vehicle. To this end I have provided an arrangement of seat base and back adapted to bring about a unitary action of the back and the seat portion thereof when in vibratory motion under the swaying and oscillating movement of the vehicle.

It is noted that when a rider uses one of these devices, that while the seat continues to fully support the anatomy as heretofore, it is much more comfortable than to ride on the bare cushions, as was heretofore done. During riding, the seat has a number of motions; but no matter what the motion, the back and particularly the small of the back are always fully and resiliently supported.

Furthermore, due to the up and down motion of vibration in the ordinary automobile seat, there is always a constant rubbing upon the clothes of the wearer, especially at the back, which is quite unpleasant; while with the present arrangement the rubbing comes between the supplementary device and the cushions and is therefore not felt by the rider.

Other objects of the invention will appear as the description proceeds; and while herein minute details of the invention are described, the invention is not limited to these since many and various changes may be made without departing from the scope of the invention as claimed.

In the accompanying drawing, showing by way of example, one of many possible embodiments of the invention, Figure 1 is a section showing the invention adapted for use with ordinary automobile seats without modification, and Fig. 2 is a perspective view of the device of Fig. 1, removed from the automobile seat.

In order to provide a supplemental back adapted to be applied to all ordinary seats without modification, I have provided the arrangement here shown applied to an ordinary automobile or other vehicle seat 15 having a rigid back 16 and spring supported cushions 17 and 18 mounted on and yieldably movable toward and from said seat 15 and back 16 respectively. To this usual automobile seat I apply a supplemental seat and back member 19 composed of an integral piece of stiff fibrous material comprising a seat portion 20 secured on and movable up and down with the seat cushion 17, and a supplemental back 21 also movable up and down with the seat cushion 17 and movable relative to the back cushion 18 in a plane substantially parallel to the back cushion. In order to prevent the upper part of the supplemental back from pulling away from the rigid back or otherwise leaving its proper place, I provide a flexible shield 23 covering over the meeting plane between the upper part of the supplemental-seat back and the upper part of the vehicle seat back, and having its front and rear edges 24 and 25 respectively suitably secured to the front face of the supplemental seat back 21 and the rear face of the vehicle seat back 16.

Straps 27 secured at their ends to the seat portion 20 and the fixed back 16 respectively, hold the seat portion in place on the vehicle seat.

Since the member 19 is a one-piece member, the seat and back thereof always maintain the same relation to each other. A particular advantage of this form of the invention is that it may be applied, without modification, to any usual form of vehicle seat, all of which are removable, and that it permits the easy removal of said seat without disengaging any of the holding means.

I claim:

1. In combination, a vehicle having a back and a spring supported main seat; a supplemental stiff member comprising a seat portion disposed on and movable up and down with said main seat and a back portion also movable up and down with said main seat; and means securing said seat portion to the lower part of the vehicle seat back and free from connection with the main seat.

2. In combination, a vehicle seat having a back and a main spring supported seat; a supplemental stiff member comprising a back portion and a seat portion disposed on and movable up and down with said seat and a back also movable up and down with said seat; movable means securing said back portion of the supplemental member to the upper part of the vehicle seat back; and means secured to the lower part of said back, and to the back of the vehicle and free from connection with the main seat for permanently holding said seat portion in place while permitting easy removal of the seat cushion.

3. In combination, an automobile or other vehicle seat having a rigid back; a spring supported back cushion mounted on and yieldably movable toward and from said back; a spring supported main seat cushion removably mounted on said seat; a supplemental seat composed of an integral piece of stiff fibrous material and comprising a seat portion disposed on and movable up and down with the main seat cushion, and a stiff back also movable up and down with the main seat cushion and movable up and down relative to the back cushion in a plane parallel to the back cushion; a flexible shield having its front and rear edges respectively secured to the front face of the upper part of the supplemental seat back portion and the rear face of the upper part of the vehicle seat back; and straps disposed under said back cushion and having their ends secured to said seat portion and the lower part of said rigid back respectively for permanently holding the seat portion in place; said supplemental seat portion and straps being entirely free of connection with said removable seat cushion to permit easy removal of the latter.

OLAF K. PACHT.

Witnesses:
H. M. KILPATRICK,
H. D. PENNEY.